US012760681B2

(12) United States Patent
Fryer et al.

(10) Patent No.: US 12,760,681 B2
(45) Date of Patent: Oct. 13, 2026

(54) SHROUD ARRESTOR FOR BLADED POWERPLANT ROTOR

(71) Applicant: Pratt & Whitney Canada Corp., Longueuil (CA)

(72) Inventors: Michael Fryer, Oakville (CA); Hamid Khorrami, Longueuil (CA)

(73) Assignee: Pratt & Whitney Canada Corp., Longueuil (CA)

(*) Notice: Subject to any disclaimer, the term of this patent is extended or adjusted under 35 U.S.C. 154(b) by 109 days.

(21) Appl. No.: 18/784,227

(22) Filed: Jul. 25, 2024

(65) Prior Publication Data

US 2026/0028936 A1 Jan. 29, 2026

(51) Int. Cl.
*F02C 7/00* (2006.01)
*F02C 3/08* (2006.01)

(52) U.S. Cl.
CPC . *F02C 7/00* (2013.01); *F02C 3/08* (2013.01)

(58) Field of Classification Search
CPC .................................................... F01D 21/045
See application file for complete search history.

(56) References Cited

U.S. PATENT DOCUMENTS 5,601,406 A 2/1997 Chan
5,613,830 A 3/1997 Chan
5,618,162 A 4/1997 Chan
6,224,321 B1 5/2001 Ebden
7,874,136 B2 1/2011 Heyerman
8,087,880 B2 1/2012 Karafillis
8,166,746 B2 5/2012 Heyerman
8,393,851 B2 3/2013 Schlienger
8,511,971 B2 8/2013 Hollman
10,359,051 B2 7/2019 Gage
10,704,560 B2 7/2020 Aker
2002/0004005 A1* 1/2002 Sathianathan ........ F01D 21/045 415/173.1
2008/0069690 A1 3/2008 Ivakitch
(Continued)

FOREIGN PATENT DOCUMENTS

EP 1383987 B1 1/2006
WO 1992007180 A1 4/1992

OTHER PUBLICATIONS

EP Search Report for EP Patent Application No. 25191985.8 dated Dec. 12, 2025.

*Primary Examiner* — David P. Olynick
(74) *Attorney, Agent, or Firm* — Getz Balich LLC

(57) ABSTRACT

An assembly is provided for a powerplant. This assembly includes a radial flow rotor, a rotor shroud and a shroud arrestor. The radial flow rotor is configured to rotate about an axis. The radial flow rotor includes a rotor base and a plurality of rotor blades arranged circumferentially around and connected to the rotor base. The rotor shroud circumscribes the radial flow rotor. The rotor shroud is disposed adjacent tips of the rotor blades. The shroud arrestor includes an arrestor body and an arrestor mount. The arrestor body is cantilevered from the arrestor mount and circumscribes the rotor shroud. The arrestor body projects longitudinally out from the arrestor mount to a distal end of the shroud arrestor. The distal end of the shroud arrestor is next to the rotor shroud and is spaced from the rotor shroud by an air gap.

19 Claims, 8 Drawing Sheets

(56) References Cited

U.S. PATENT DOCUMENTS

| | | | | |
|---|---|---|---|---|
| 2016/0069214 | A1* | 3/2016 | Engebretsen | F01D 21/045 415/196 |
| 2017/0234147 | A1* | 8/2017 | Moniz | F01D 5/225 415/173.1 |
| 2019/0383304 | A1 | 12/2019 | Aker | |
| 2021/0062824 | A1 | 3/2021 | Nesteroff | |

* cited by examiner

SHROUD ARRESTOR FOR BLADED POWERPLANT ROTOR

TECHNICAL FIELD

This disclosure relates generally to a powerplant and, more particularly, to a structure for the powerplant with a rotor shroud.

BACKGROUND INFORMATION

A powerplant for an aircraft may include a compressor section with a compressor impeller. This compressor impeller is shrouded by a shroud. Various types and configurations of shrouds and structures surrounding those shrouds are known in the art. While these known shrouds and surrounding structures have various benefits, there is still room in the art for improvement.

SUMMARY

According to an aspect of the present disclosure, an assembly is provided for a powerplant. This assembly includes a radial flow rotor, a rotor shroud and a shroud arrestor. The radial flow rotor is configured to rotate about an axis. The radial flow rotor includes a rotor base and a plurality of rotor blades arranged circumferentially around and connected to the rotor base. The rotor shroud circumscribes the radial flow rotor. The rotor shroud is disposed adjacent tips of the rotor blades. The shroud arrestor includes an arrestor body and an arrestor mount. The arrestor body is cantilevered from the arrestor mount and circumscribes the rotor shroud. The arrestor body projects longitudinally out from the arrestor mount to a distal end of the shroud arrestor. The distal end of the shroud arrestor is next to the rotor shroud and is spaced from the rotor shroud by an air gap.

According to another aspect of the present disclosure, another assembly is provided for a powerplant. This assembly includes a radial flow rotor, a rotor shroud and a shroud arrestor. The radial flow rotor is configured to rotate about an axis. The radial flow rotor includes a rotor base and a plurality of rotor blades arranged circumferentially around and connected to the rotor base. The rotor shroud circumscribes the radial flow rotor. The rotor shroud is disposed adjacent tips of the rotor blades. The shroud arrestor is structurally disengaged from the rotor shroud. The shroud arrestor includes an arrestor body and an arrestor mount. The arrestor body circumscribes the rotor shroud and projects longitudinally out from the arrestor mount to a distal end of the shroud arrestor. The arrestor body has a cone shaped geometry.

According to still another aspect of the present disclosure, another assembly is provided for a powerplant. This assembly includes a radial flow rotor, a rotor shroud and a shroud arrestor. The radial flow rotor is configured to rotate about an axis. The radial flow rotor includes a rotor base and a plurality of rotor blades arranged circumferentially around and connected to the rotor base. The rotor shroud circumscribes the radial flow rotor. The rotor shroud is disposed adjacent tips of the rotor blades. The shroud arrestor includes an arrestor body and an arrestor mount. The arrestor body is cantilevered from the arrestor mount and circumscribes the rotor shroud. The arrestor body projects longitudinally out from the arrestor mount to a distal end of the shroud arrestor. The arrestor body is configured with an elliptical segment sectional profile between the arrestor mount and the distal end of the shroud arrestor.

The shroud arrestor may be disengaged from the rotor shroud.

The arrestor body may be configured to engage the rotor shroud during a failure event.

The rotor shroud may include a shroud wall and a shroud mount. The shroud wall may be disposed adjacent the tips of the rotor blades. An annular groove may be formed by and extend radially between the shroud wall and the shroud mount. The arrestor body may project longitudinally into the annular groove to the distal end of the shroud arrestor.

The distal end of the shroud arrestor may be aligned with an intersection between the shroud wall and the shroud mount.

The assembly may also include a stationary structure. The shroud mount may couple the rotor shroud to the stationary structure. The arrestor mount may couple the shroud arrestor to the stationary structure.

The arrestor body may have a wall thickness that is less than a wall thickness of a shroud wall of the rotor shroud that is disposed adjacent the tips of the rotor blades.

The arrestor body may have an elliptical segment sectional profile.

The arrestor body may have a cone shaped geometry.

A section of the arrestor body may follow a trajectory from the arrestor mount towards the distal end of the shroud arrestor. A slope of the trajectory may decrease as the arrestor mount projects towards the distal end of the shroud arrestor.

An end portion of the arrestor body at the distal end of the shroud arrestor may have a channeled sectional geometry.

The shroud arrestor may include a plurality of segments arranged circumferentially about the axis.

The segments may include a first segment and a second segment disposed circumferentially next to the first segment. The first segment may be mechanically fastened to the second segment.

The first segment may be mechanically fastened to the second segment at a location proximate the distal end of the shroud arrestor.

One or more openings may be formed in the arrestor body longitudinally between the arrestor mount and the distal end of the shroud arrestor. The one or more openings may be arranged circumferentially about the axis.

The assembly may also include a stationary structure including a structure flange and a retaining tab. The arrestor mount may be disposed in a channel formed by and axially between the structure flange and the retaining tab. The arrestor mount may be bolted to the structure flange.

The radial flow rotor may be configured as a compressor impeller.

The assembly may also include a compressor section, a turbine section and a combustion volume between the compressor section and the turbine section along a flowpath. The compressor section may be configured as or otherwise include the radial flow rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
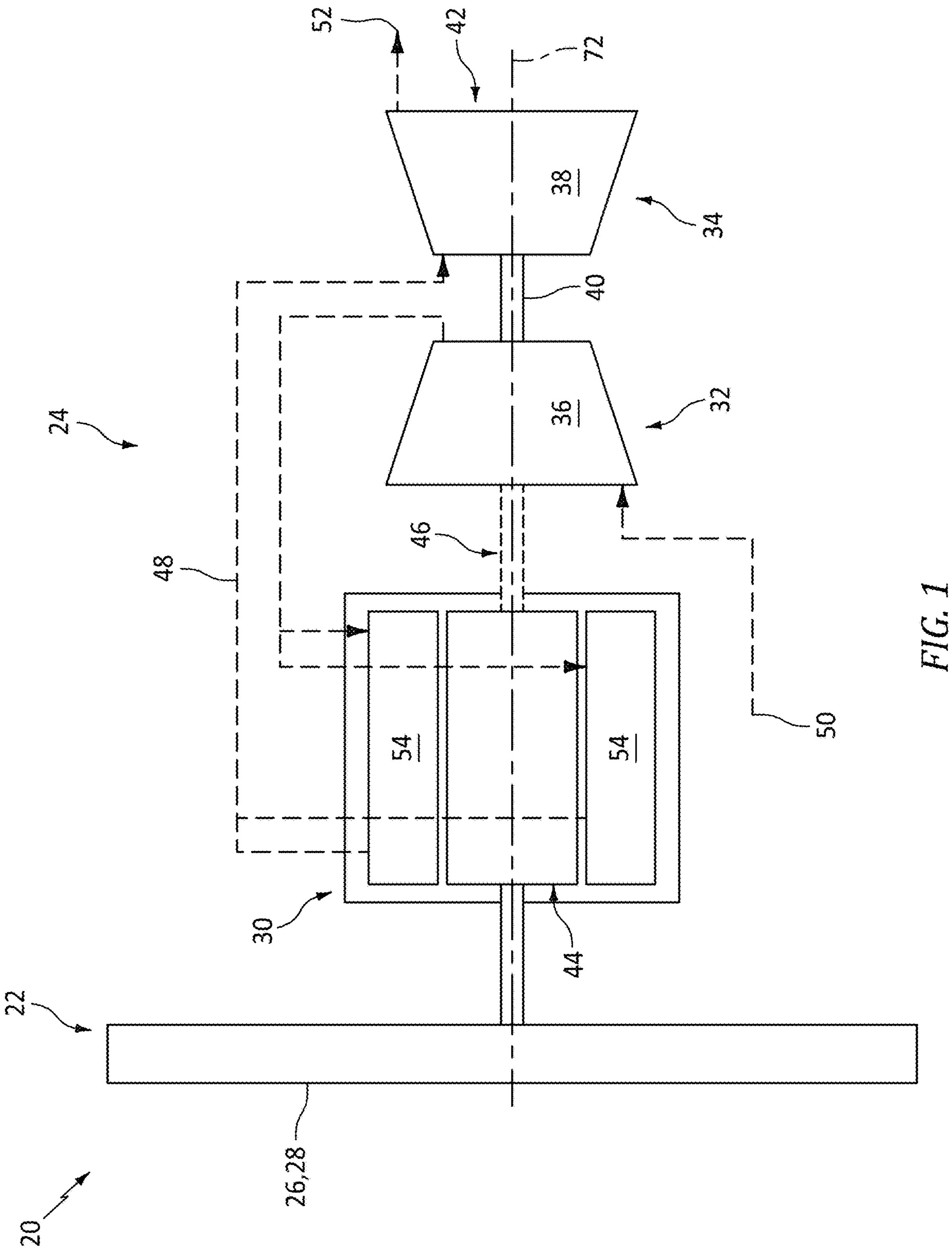
FIG. 1 is a schematic illustration of an aircraft powerplant with an intermittent internal combustion engine.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The powerplant 20 may be configured as, or otherwise included as part of, a propulsion system for the aircraft. The powerplant 20 may also or alternatively be configured as, or otherwise included as part of, an electrical power system for the aircraft. The present disclosure, however, is not limited to aircraft applications. The powerplant 20, for example, may alternatively be configured as, or otherwise included as part of, an electrical power system for ground-based operation (e.g., an industrial powerplant), or otherwise. However, for ease of description, the powerplant 20 is described below as an aircraft powerplant.

The aircraft powerplant 20 of FIG. 1 includes a mechanical load 22 powered by an engine system 24. The mechanical load 22 may be configured as or otherwise include a rotor 26 mechanically driven by the engine system 24. This driven rotor 26 may be a bladed propulsor rotor for the aircraft propulsion system. The propulsor rotor may be an open propulsor rotor (e.g., an un-ducted propulsor rotor) or a ducted propulsor rotor. For example, where the engine system 24 is a propeller engine (e.g., a turbocharged propeller engine, a turbo-compound propeller engine or a turboprop engine), the open propulsor rotor may be a propeller rotor 28. Where the engine system 24 is a turboshaft engine, the open propulsor rotor may be a rotorcraft rotor such as a helicopter main rotor or a helicopter tail rotor. Where the engine system 24 is a turbofan engine, the ducted propulsor rotor may be a fan rotor. Alternatively, the driven rotor 26 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary engine systems. The engine system 24, for example, may alternatively be configured as a turbojet engine, a propfan engine, a pusher fan engine or any other type of turbine engine operable to power the operation of the mechanical load 22. However, for ease of description, the driven rotor 26 is described below as the propeller rotor 28.

The engine system 24 may be configured as a turbocharged or turbo-compound engine. The engine system 24 of FIG. 1, for example, includes an intermittent internal combustion (IC) engine 30, a compressor section 32 (e.g., an engine compressor) and a turbine section 34 (e.g., an engine turbine). The internal combustion engine 30 may be configured as a reciprocating piston engine or a rotary engine. Examples of the reciprocating piston engine include, but are not limited to, a radial engine, an inline (I) engine, a V-engine and a W-engine. A non-limiting example of the rotary engine is a Wankel engine. The compressor section 32 includes a bladed compressor rotor 36. The turbine section 34 includes a bladed turbine rotor 38. This turbine rotor 38 is coupled to and rotatable with the compressor rotor 36. The turbine rotor 38 of FIG. 1, for example, is connected to the compressor rotor 36 through a shaft 40. At least (or only) a combination of the compressor rotor 36, the turbine rotor 38 and the shaft 40 may collectively form a turbo-compressor rotating assembly 42; e.g., a spool. This turbo-compressor rotating assembly 42 may be rotationally discrete from an internal rotating assembly 44 of the internal combustion engine 30. Alternatively, the turbo-compressor rotating assembly 42 may be operatively coupled to and rotatable with engine rotating assembly 44 through a drivetrain 46 (see dashed line). This drivetrain 46 may be a direct drive drivetrain or a geared drivetrain.

The aircraft powerplant 20 and its engine system 24 include an internal powerplant flowpath 48. This powerplant flowpath 48 extends from an inlet 50 into the aircraft powerplant 20 and its engine system 24 to a combustion products exhaust 52 from the aircraft powerplant 20 and its engine system 24. More particularly, the powerplant flowpath 48 extends sequentially through the compressor section 32, through one or more combustion zones 54 (e.g., cylinder chambers, etc.) within the internal combustion engine 30, and through the turbine section 34 from the flowpath inlet 50 to the flowpath exhaust 52. With this arrangement, air delivered to the internal combustion engine 30 is compressed by the compressor rotor 36, and combustion products produced by combustion of a mixture of the compressed air and fuel within the combustion zone(s) 54 drives rotation of the engine rotating assembly 44 and the turbine rotor 38. The rotation of the engine rotating assembly 44 drives rotation of the propeller rotor 28—the driven rotor 26. The rotation of the turbine rotor 38 drives rotation of the compressor rotor 36 to facilitate the compression of the incoming air to the internal combustion engine 30. The rotation of the turbine rotor 38 may also assist driving rotation of the engine rotating assembly 44 where the turbo-compressor rotating assembly 42 is coupled to the engine rotating assembly 44 through the optional direct drive or geared drivetrain 46.

Figure 2:
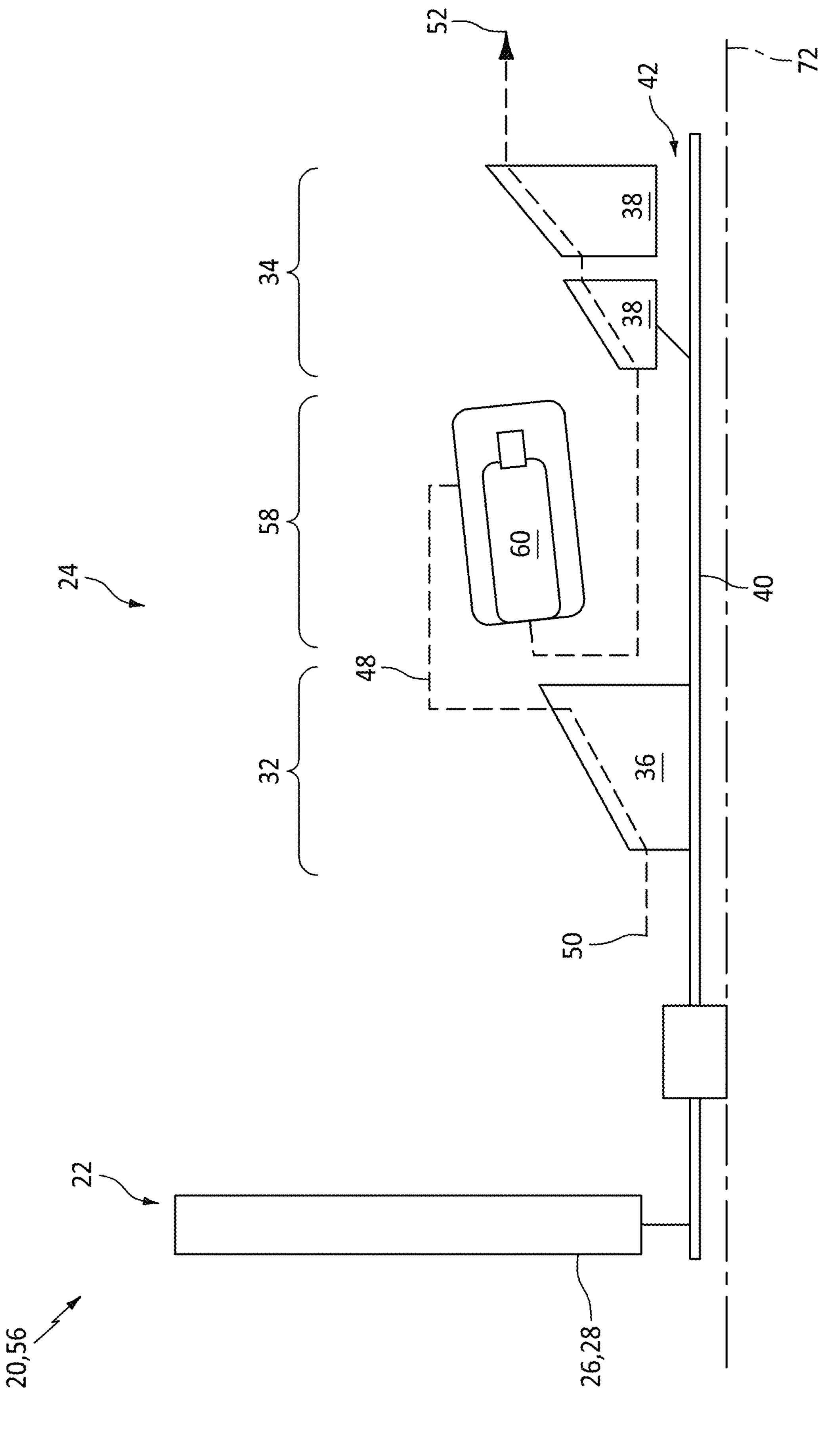
FIG. 2 is a partial schematic illustration of the aircraft powerplant with a gas turbine engine.

While the engine system 24 is described above as including the internal combustion engine 30 fluidly coupled between the compressor section 32 and the turbine section 34, the aircraft powerplant 20 of the present disclosure is not limited to such an exemplary arrangement as described above. For example, referring to FIG. 2, the engine system 24 may alternatively be configured as a gas turbine engine 56 where the internal combustion engine 30 of FIG. 1 is replaced by a combustor section 58 of FIG. 2. With such an arrangement, the powerplant flowpath 48 extends sequentially through the compressor section 32, through a combustion chamber 60 (e.g., an annular combustion chamber) within the combustor section 58, and through the turbine section 34 from the flowpath inlet 50 to the flowpath exhaust 52. For case of illustration, the turbine engine 56 of FIG. 2 is shown as a single spool turbine engine. It is contemplated, however, the turbine engine 56 may alternatively include two or more spools; e.g., two or more internal rotating assemblies.

Figure 3:
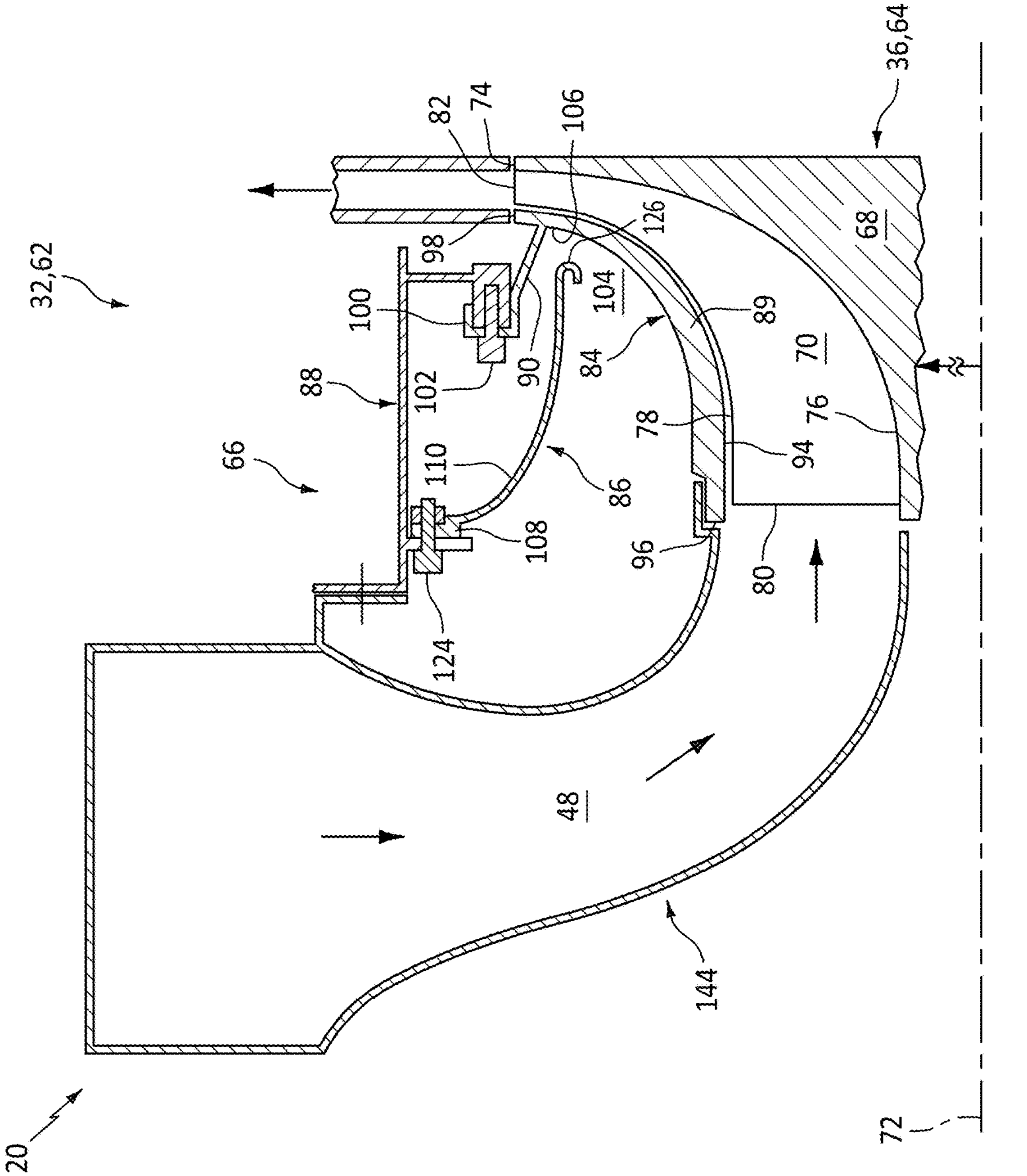
FIG. 3 is a partial sectional illustration of a section of the aircraft powerplant with a bladed powerplant rotor within a housing structure.

FIG. 3 partially illustrates a section 62 of the aircraft powerplant 20. This powerplant section 62 includes a bladed powerplant rotor 64 and a housing structure 66. For ease of description, the powerplant section 62 is described below as the compressor section 32, and the powerplant rotor 64 is described below as the compressor rotor 36. The powerplant section 62 of the present disclosure, however, is not limited to such an exemplary configuration. It is contemplated, for example, the powerplant section 62 may alternatively be configured as the turbine section 34, and the powerplant rotor 64 may alternatively be configured as the turbine rotor 38 within the turbine section 34.

Figure 4:
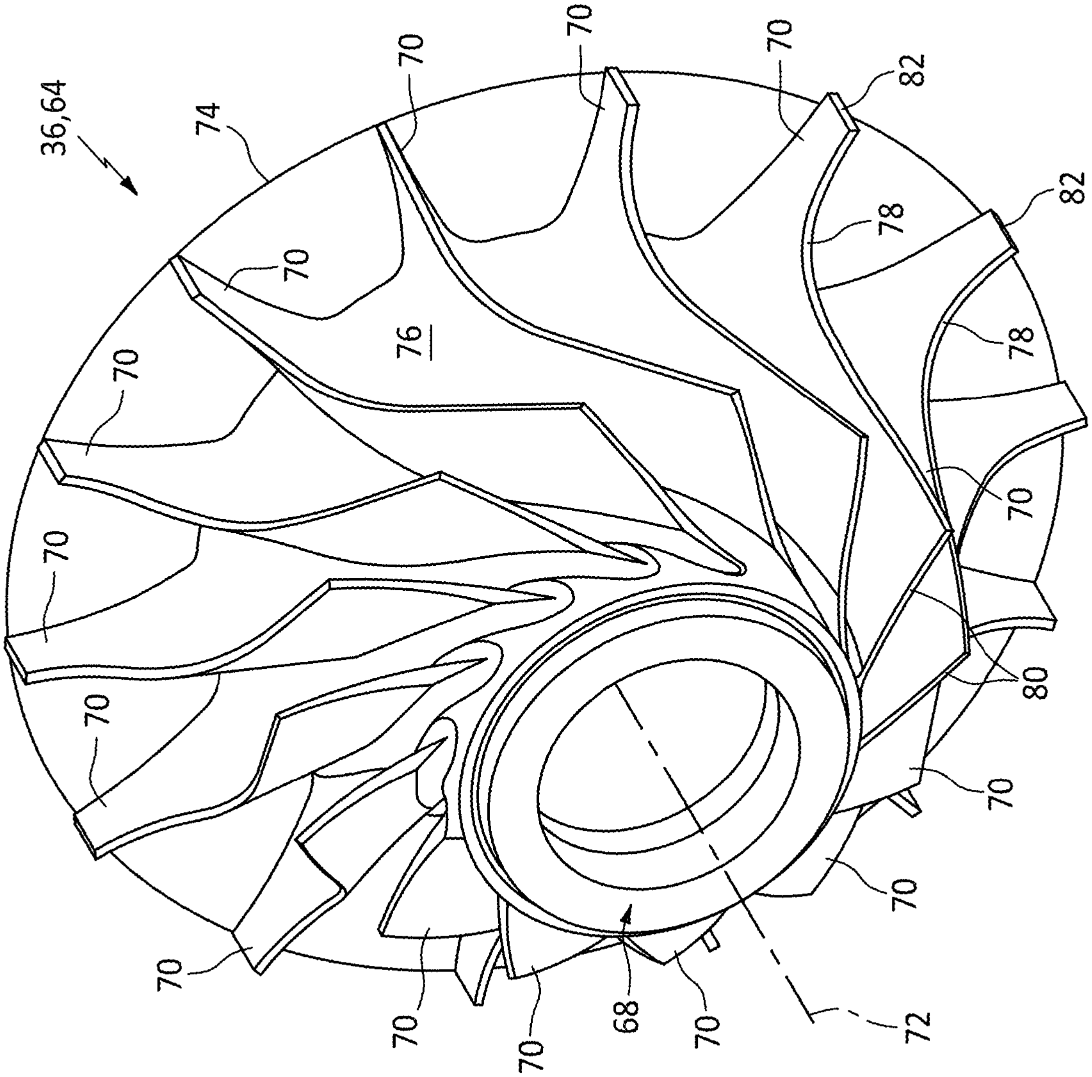
FIG. 4 is a perspective illustration of the powerplant rotor.

The powerplant rotor 64 may be configured as a radial flow rotor; e.g., a compressor impeller. The powerplant rotor 64 of FIG. 3, for example, is configured to receive the incoming (e.g., uncompressed) air substantially along an axial trajectory and then output the compressed air substantially along a radial outward trajectory. Referring to FIG. 4, the powerplant rotor 64 includes a rotor base 68 (e.g., a hub, is disk, etc.) and a plurality of rotor blades 70 (e.g., vanes, airfoils, etc.).

Referring to FIG. 3, the rotor base 68 extends axially along an axis 72. This axis 72 is an axial centerline and a rotational axis of the powerplant rotor 64. The axis 72 may also be an axial centerline of the powerplant section 62 and, more generally, an axial centerline of the aircraft powerplant 20 and/or one or more of its members 26, 30, 34 (see FIGS. 1 and 2). The rotor base 68 of FIG. 3 projects radially outward (in a radial outward direction away from the axis 72) to a radial outer side 74 of the powerplant rotor 64 and its rotor base 68. The rotor base 68 forms a platform with an inner flowpath surface 76. This inner flowpath surface 76 may have a curved (e.g., arcuate, quarter circular, splined, etc.) sectional geometry when viewed, for example, in an axial reference plane parallel with (e.g., including) the axis 72. With this arrangement, the rotor blade 70 projects radially outward and axially to the inner flowpath surface 76.

Referring to FIG. 4, the rotor blades 70 are arranged circumferentially around the axis 72 and the rotor base 68 in an annular array; e.g., a circular array. Each of the rotor blades 70 is connected (e.g., formed integral with or mechanically fastened, welded, brazed and/or otherwise attached to) the rotor base 68. Referring to FIG. 3, each rotor blade 70 projects axially out from the rotor base 68 and its inner flowpath surface 76 along the axis 72 to a tip 78 of the respective rotor blade 70 and an axial end 80 of the respective rotor blade 70. Each rotor blade 70 projects radially out from the rotor base 68 and its inner flowpath surface 76 outward to its blade tip 78 and a radial end 82 of the respective rotor blade 70. The blade tip 78 projects radially inwards (in a radial inward direction towards the axis 72) from the blade radial end 82, and the blade tip 78 projects axially along the axis 72 to the blade axial end 80. The blade axial end 80 forms a leading edge of the respective rotor blade 70. The blade radial end 82 forms a trailing edge of the respective rotor blade 70. Referring to FIG. 4, each rotor blade 70 has a pressure side (e.g., a concave side) and a suction side (e.g., a convex side).

Referring to FIG. 3, the powerplant rotor 64 is housed within the housing structure 66. This housing structure 66 includes a rotor shroud 84 (e.g., a blade outer air seal (BOAS)), a shroud arrestor 86 and a support structure 88. Briefly, the support structure 88 may be any stationary structure of the aircraft powerplant 20 and its engine system 24 configured to structurally support the rotor shroud 84 and the shroud arrestor 86. The support structure 88 of FIG. 3 is disposed radially outboard of, extends axially along (e.g., axially overlaps) and extends circumferentially about (e.g., circumscribes) each of the housing structure members 84 and 86. This support structure 88 may be configured as a single component, or a group of discretely formed components connected together into a single structure. Examples of the support structure 88 include, but are not limited to, an engine case, a support frame, a flowpath wall, a duct (e.g., a compressor scroll) or the like.

The rotor shroud 84 is arranged next to and radially outboard of the powerplant rotor 64. The rotor shroud 84 of FIG. 3, for example, includes a shroud wall 89 and a shroud mount 90. The shroud wall 89 is disposed radially and/or axially adjacent the blade tips 78. This shroud wall 89 extends circumferentially around the powerplant rotor 64, thereby circumscribing the rotor blades 70 and their blade tips 78. The shroud wall 89 forms an outer flowpath surface 94 opposite the inner flowpath surface 76. This outer flowpath surface 94 may have a curved (e.g., arcuate, quarter circular, splined, etc.) sectional geometry when viewed, for example, in the axial reference plane. With this arrangement, a portion of the powerplant flowpath 48 within the compressor section 32 extends longitudinally across the powerplant rotor 64, and is bounded (e.g., radially and/or axially) between the inner flowpath surface 76 and the outer flowpath surface 94. The rotor shroud 84 and its shroud wall 89 thereby form an outer flowpath wall along the powerplant flowpath 48 within the compressor section 32.

The shroud wall 89 projects axially along the axis 72 to an axial end 96 of the rotor shroud 84 and its shroud wall 89. This shroud wall axial end 96 may form an upstream end of the outer flowpath surface 94 along the powerplant flowpath 48. The shroud wall 89 projects radially outward to an outer radial end 98 of the shroud wall 89. This shroud wall radial end 98 may form a downstream end of the outer flowpath surface 94 along the powerplant flowpath 48.

The shroud mount 90 is connected to (e.g., formed integral with or otherwise attached to) a portion of the shroud wall 89, at (e.g., on, adjacent or proximate) the shroud wall radial end 98 for example. The shroud mount 90 of FIG. 3 projects axially and/or radially outward from the shroud wall 89 to a distal end 100 of the shroud mount 90. This shroud mount 90 is attached to the support structure 88 by one or more fasteners 102; e.g., bolts. The shroud mount 90 thereby mounts the rotor shroud 84 and its shroud wall 89 to the support structure 88.

The rotor shroud 84 of FIG. 3 is configured with a shroud groove 104. This shroud groove 104 projects axially along the axis 72 into the rotor shroud 84 to an axial apex 106 of the shroud groove 104. The groove apex 106 of FIG. 3 is disposed at and may be formed by an intersection between the shroud wall 89 and the shroud mount 90. The shroud groove 104 extends radially within the rotor shroud 84 between and is formed by a radial outer side of the shroud wall 89 and a radial inner side of the shroud mount 90. The shroud groove 104 extends within the rotor shroud 84 and along its members 89 and 90 circumferentially around the axis 72 providing the shroud groove 104 with a full-hoop (e.g., annular) geometry. The shroud groove 104 of FIG. 3 is thereby an annular groove.

The shroud arrestor 86 is arranged next to and radially outboard of the rotor shroud 84 and its shroud wall 89. The shroud arrestor 86 of FIG. 3 includes an arrestor mount 108 and an arrestor body 110. The shroud arrestor 86 and each of its members 108, 110 extends circumferentially about (e.g., completely around) the axis 72, providing the shroud arrestor 86 and each of its members 108, 110 with a full-hoop (e.g., annular and/or tubular) geometry for example. The shroud arrestor 86 of FIG. 3 and at least its arrestor body 110 may thereby circumscribe the rotor shroud 84.

Figure 5:
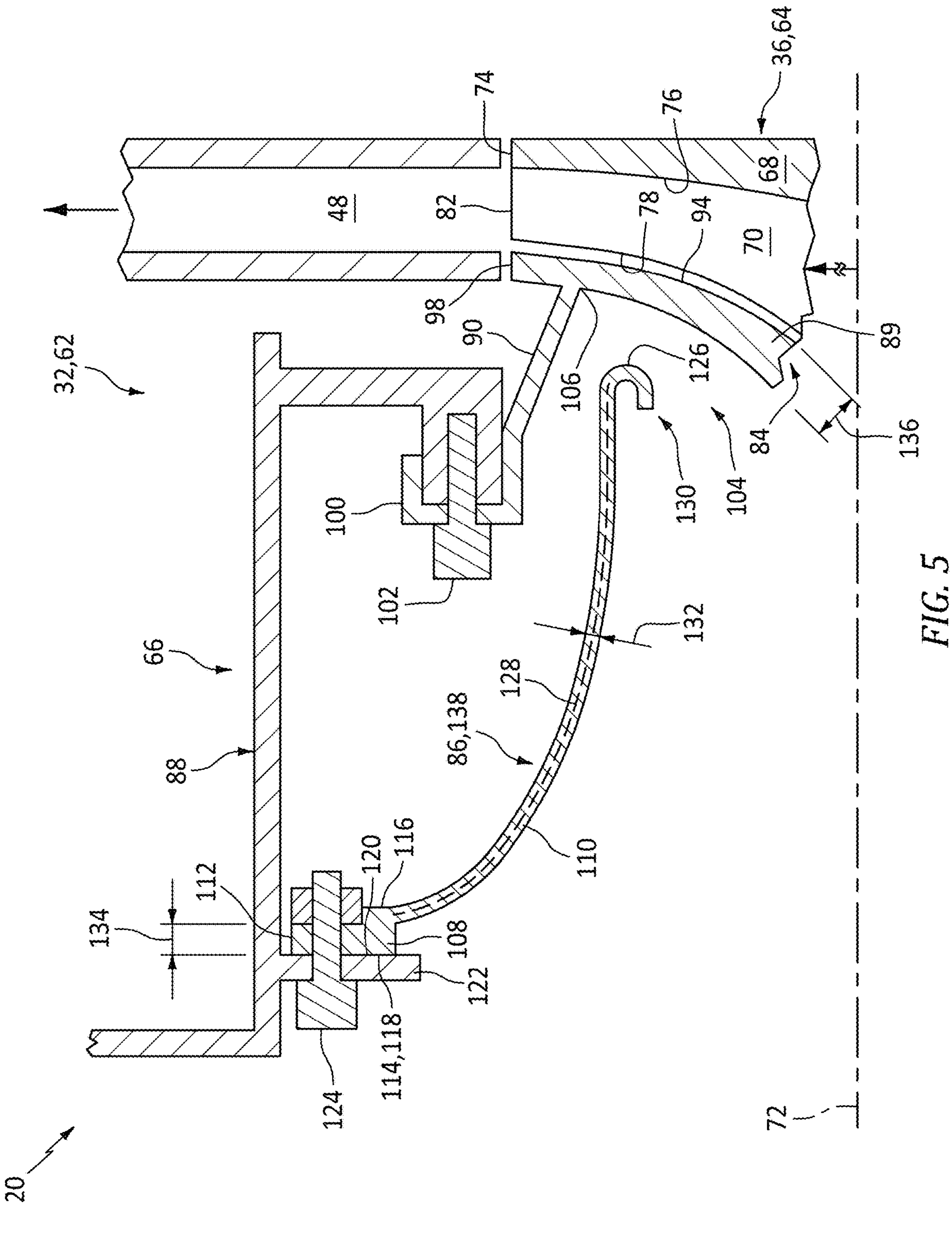
FIG. 5 is a partial sectional illustration of the powerplant section at a shroud arrestor.

Referring to FIG. 5, the arrestor mount 108 may be configured as a radial flange or rim. The arrestor mount 108 of FIG. 5, for example, projects radially out from the arrestor body 110 to a radial outer distal end 112 of the shroud arrestor 86 and its arrestor mount 108. The arrestor mount 108 extends axially along the axis 72 between opposing axial sides 114 and 116 of the arrestor mount 108, where the arrestor mount first side 114 may also be a first axial end of the shroud arrestor 86. The arrestor mount 108 of FIG. 5 includes a (e.g., circumferentially segmented) planar, annular surface 118 at the arrestor mount first side 114. The arrestor mount 108 and its arrestor mount surface 118 axially engage (e.g., contact, abut against) a planar, annular surface 120 of a mounting flange 122 of the support structure 88. The arrestor mount 108 is attached to the mounting flange 122 by one or more fasteners 124; e.g., bolts and nuts. The arrestor mount 108 thereby mounts the shroud arrestor 86 and its arrestor body 110 to the support structure 88. Here, the coupling between the arrestor mount 108 and the support structure 88 is spaced axially (e.g., forward, upstream) from the coupling between the shroud mount 90 and the support structure 88. The coupling between the arrestor mount 108 and the support structure 88 may also be disposed radially outboard of the coupling between the shroud mount 90 and the support structure 88.

The arrestor body 110 is connected to (e.g., formed integral with or otherwise attached to) the arrestor mount 108. More particularly, the arrestor body 110 is cantilevered from the arrestor mount 108. The arrestor body 110 of FIG. 5, for example, projects longitudinally out from the arrestor mount 108 and partially into the shroud groove 104 to a distal end 126 of the shroud arrestor 86 and its arrestor body 110. Here, the body distal end 126 is also a radial inner end and/or a second axial end of the shroud arrestor 86 and its arrestor body 110. The body distal end 126 may be radially aligned with or otherwise disposed proximate the groove apex 106/the intersection between the rotor shroud members 89 and 90. This body distal end 126, however, is axially and radially spaced from the rotor shroud 84 and its members 89 and 90 by an air gap. The shroud arrestor 86 of FIG. 5 and its arrestor body 110 are thereby disposed proximate, but are disengaged from the rotor shroud 84 and its members 89 and 90; e.g., during normal operation of the aircraft powerplant 20 and its engine system 24.

The arrestor body 110 may (e.g., continuously) radially taper as the arrestor body 110 projects longitudinally out from (or about) the arrestor mount 108 to (or about) the body distal end 126. The arrestor body 110 of FIG. 5, for example, has a cone-shaped geometry. Examples of this cone-shaped geometry include, but are not limited to, a funnel-shaped geometry, a horn-shaped geometry, a frustoconical geometry, or the like. For example, a side section of the arrestor body 110 of FIG. 5 has a curved (e.g., elliptical segment) sectional profile when viewed in the axial reference plane. This side section of the arrestor body 110 follows a trajectory 128 as the arrestor body 110 projects longitudinally out from the arrestor mount 108 to the body distal end 126. The body trajectory 128 may have a slope that (e.g., non-uniformly, exponentially, etc.) decreases as the arrestor body 110 projects longitudinally out from (or about) the arrestor mount 108 to (or about) the body distal end 126. Herein, the term "slope" may describe a ratio between a radial rise over an axial run. With this arrangement, a longitudinal portion of the arrestor body 110 adjacent the arrestor mount 108 extends axially and radially (or substantially radially) within the axial reference plane. By contrast, a longitudinal portion of the arrestor body 110 adjacent the body distal end 126 may extend substantially (or only) axially within the axial reference plane.

A wall of the arrestor body 110 may be bent-back at the body distal end 126 to provide the body distal end 126 with a bullnose or otherwise curved sectional profile. With this arrangement, a distal end portion 130 of the arrestor body 110 may have a channeled sectional geometry.

The arrestor body 110 has a wall thickness 132 that may be less than a wall thickness 134 of the arrestor mount 108. The wall thickness 132 of the arrestor body 110 may also be less than a wall thickness 136 of the shroud wall 89. The wall thickness 132 of the arrestor body 110 is tailored to facilitate tuned (e.g., permanent) deformation of the shroud arrestor 86 and its arrestor body 110 as described below in further detail.

Figure 6:
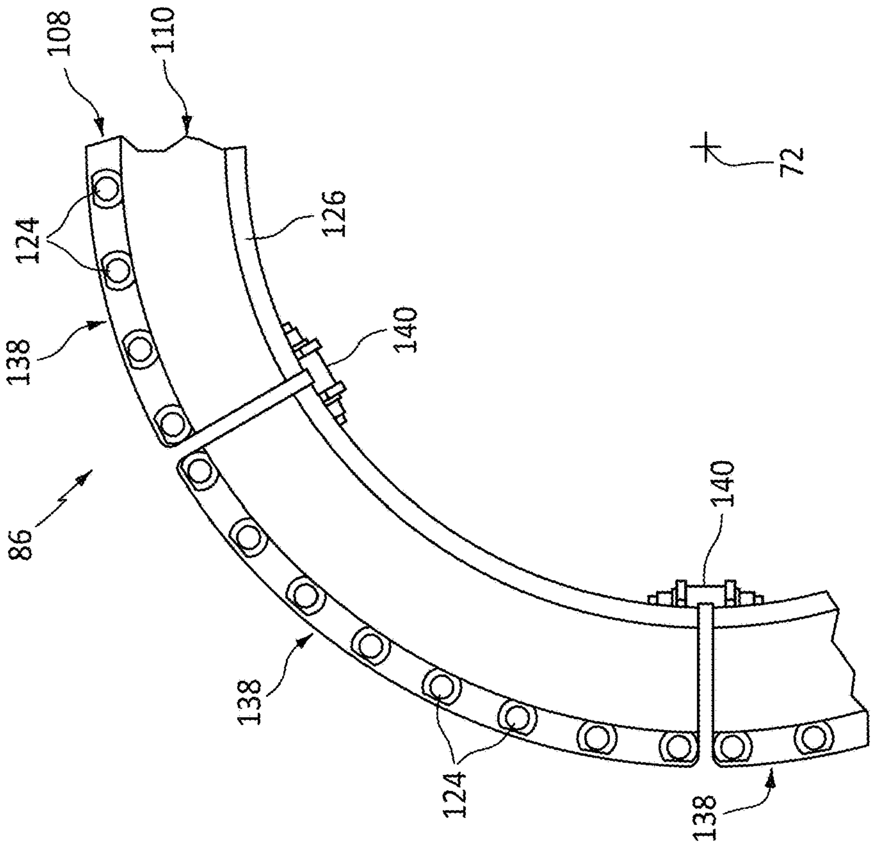

Referring to FIG. 6, the shroud arrestor 86 and its members 108 and 110 may be divided into and include a plurality of circumferential segments 138. These arrestor segments 138 are arranged circumferentially about the axis 72 and the rotor shroud 84 (see FIG. 5) in an annular array. Each arrestor segment 138 is thereby disposed circumferentially between and next to a circumferentially neighboring pair of the arrestor segments 138. Each arrestor segment 138 may also be attached to one or both of its neighboring arrestor segments 138 through a respective mechanical connection 140; e.g., a bolted connection. This mechanical connection 140 may be located radially and/or axially at or near the body distal end 126. In the specific arrangement of FIG. 6, each mechanical connection 140 may provide a sole (only) direct connection between each adjacent pair of the arrestor segments 138. However, the arrestor segments 138 are indirectly connected together through the support structure 88 (see FIG. 5).

Figure 7:
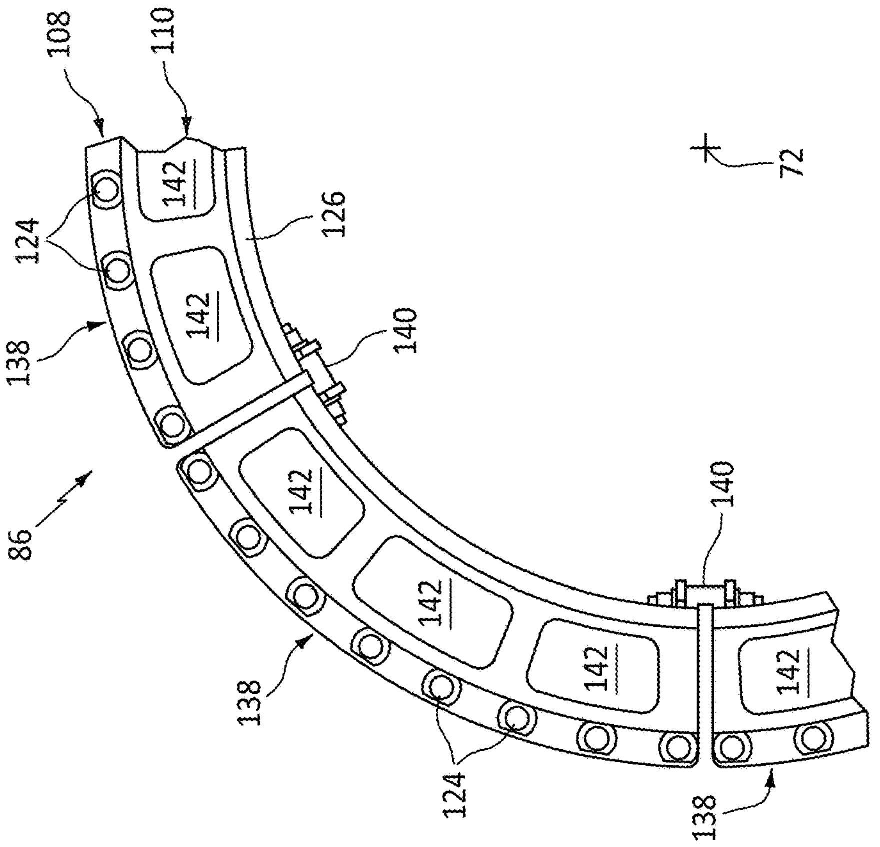
FIGS. 6 and 7 are partial illustrations of the shroud arrestor with non-perforated and perforated configurations.

In some embodiments, the arrestor body 110 along one, some or all of the arrestor segments 138 may be non-perforated. In other embodiments, referring to FIG. 7, the arrestor body 110 along one, some or all of the arrestor segments 138 may be perforated. Each segment of the arrestor body 110 of FIG. 7, for example, is configured with one or more openings 142; e.g., ports, windows, etc. Each of these openings 142 project through the wall of the arrestor body segment. Such a perforated arrangement reduces an overall mass of the shroud arrestor 86 and/or facilitate airflow across the shroud arrestor 86.

Figure 8:
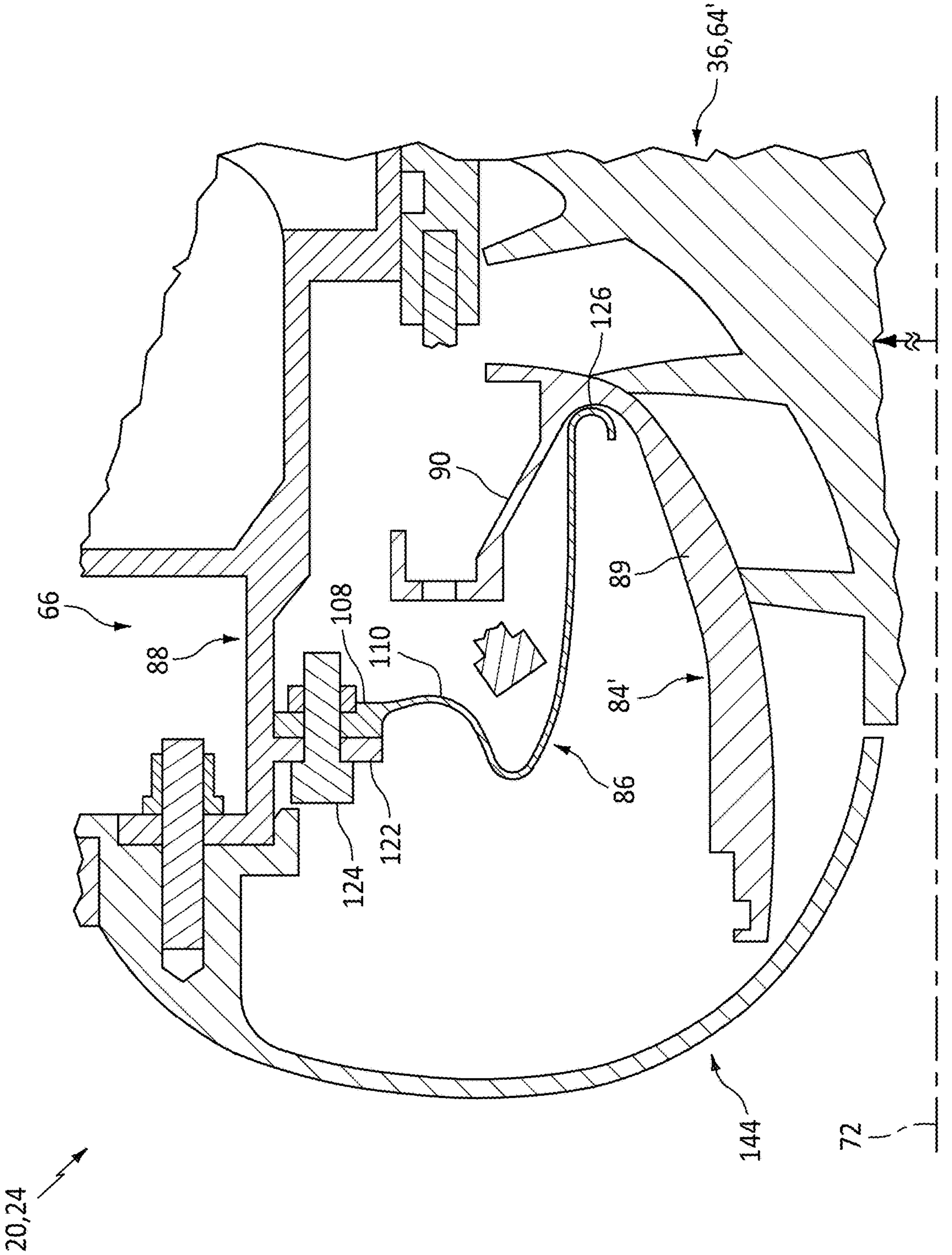
FIG. 8 is a partial sectional illustration of the powerplant section during a failure event.

Referring to FIG. 5, during normal powerplant operation, the shroud arrestor 86 is physically disengaged from the rotor shroud 84. The rotor shroud 84 may thereby thermally expand, contract or be actuated for tip clearance control (if included) without interference from the shroud arrestor 86. However, in an unlikely event of a failure event in the rotor shroud 84, the shroud arrestor 86 may provide a barrier to arrest radial outward and/or axial movement of fragments, pieces or the like of the broken rotor shroud 84' (see FIG. 8). For example, referring to FIG. 8, in the unlikely event of a broken powerplant rotor 64', pieces of the broken powerplant rotor 64' may move radially outward and hit the rotor shroud 84 (see FIG. 3). Under certain circumstances, the impact of the pieces of the broken powerplant rotor 64' against the rotor shroud 84 (see FIG. 3) may break the rotor shroud into one or more pieces. These shroud pieces may also move radially outward and axially forward in FIG. 8. This movement of the shroud pieces, however, may be blocked or limited by the shroud arrestor 86. For example, the shroud pieces may impact against the shroud arrestor 86 at the body distal end 126. While the shroud arrestor 86 and its arrestor body 110 are configured to deform upon the impact of the shroud pieces, this deformation is configured to decelerate and stop movement of the shroud pieces. The shroud arrestor 86 may thereby prevent the shroud pieces from impacting against and/or possibly breaking other components of the aircraft powerplant 20 and its engine system 24. For example, by arresting the movement of the shroud pieces, the shroud arrestor 86 of FIG. 8 may prevent and/or reduce likelihood of damage to the support structure 88 and/or other nearby components such as an inlet case 144.

Figure 9:
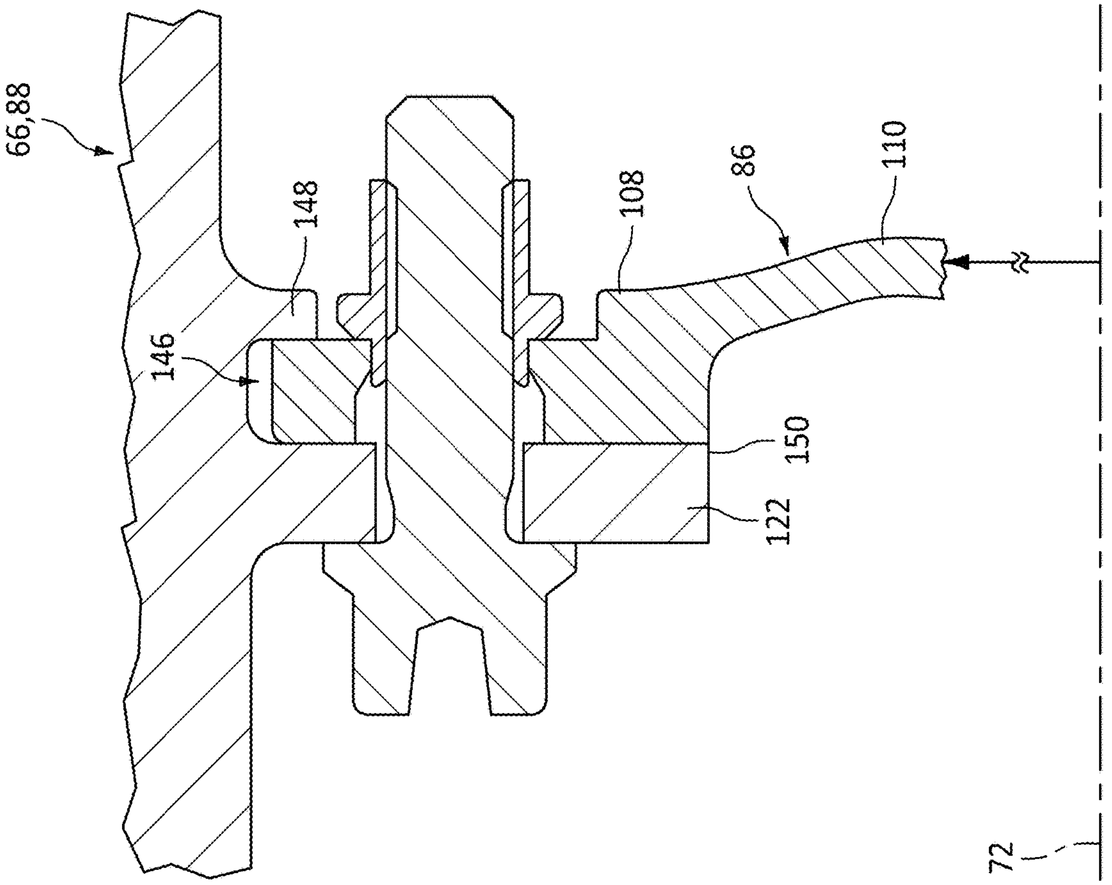
FIG. 9 is a partial sectional illustration of a coupling between the shroud arrestor and a support structure.

Referring to FIG. 9, the arrestor mount 108 may be disposed in a channel 146 formed by and axially between the mounting flange 122 and a retaining tab 148 of the support structure 88. Here, the retaining tab 148 is configured to counteract pivoting movement of the arrestor mount 108 about a radial inner edge 150 of the mounting flange 122 in the unlikely event of a failure event in the rotor shroud 84.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a powerplant, comprising:
a radial flow rotor configured to rotate about an axis, the radial flow rotor including a rotor base and a plurality of rotor blades arranged circumferentially around and connected to the rotor base;
a rotor shroud circumscribing the radial flow rotor, the rotor shroud disposed adjacent tips of the plurality of rotor blades; and
a shroud arrestor including an arrestor body and an arrestor mount, the arrestor body cantilevered from the arrestor mount and circumscribing the rotor shroud, the arrestor body projecting longitudinally out from the arrestor mount to a distal end of the shroud arrestor, and the distal end of the shroud arrestor next to the rotor shroud and spaced from the rotor shroud by an air gap;
wherein the rotor shroud includes a shroud wall and a shroud mount, the shroud wall is disposed adjacent the tips of the plurality of rotor blades, an annular groove is formed by and extends radially between the shroud wall and the shroud mount, and the arrestor body projects longitudinally into the annular groove to the distal end of the shroud arrestor.

2. The assembly of claim 1, wherein the shroud arrestor is disengaged from the rotor shroud.

3. The assembly of claim 2, wherein the arrestor body is configured to engage the rotor shroud during a failure event.

4. The assembly of claim 1, wherein the distal end of the shroud arrestor is aligned with an intersection between the shroud wall and the shroud mount.

5. The assembly of claim 1, further comprising:
a stationary structure;
the shroud mount coupling the rotor shroud to the stationary structure; and
the arrestor mount coupling the shroud arrestor to the stationary structure.

6. The assembly of claim 1, wherein the arrestor body has a wall thickness that is less than a wall thickness of the shroud wall.

7. The assembly of claim 1, wherein the arrestor body has an elliptical segment sectional profile.

8. The assembly of claim 1, wherein the arrestor body has a cone shaped geometry.

9. The assembly of claim 1, wherein
a section of the arrestor body follows a trajectory from the arrestor mount towards the distal end of the shroud arrestor; and
a slope of the trajectory decreases as the arrestor mount projects towards the distal end of the shroud arrestor.

10. The assembly of claim 1, wherein an end portion of the arrestor body at the distal end of the shroud arrestor has a channeled sectional geometry.

11. The assembly of claim 1, wherein the shroud arrestor includes a plurality of segments arranged circumferentially about the axis.

12. The assembly of claim 11, wherein
the plurality of segments include a first segment and a second segment disposed circumferentially next to the first segment; and
the first segment is mechanically fastened to the second segment.

13. The assembly of claim 12, wherein the first segment is mechanically fastened to the second segment at a location proximate the distal end of the shroud arrestor.

14. The assembly of claim 1, wherein one or more openings are formed in the arrestor body longitudinally between the arrestor mount and the distal end of the shroud arrestor, and the one or more openings are arranged circumferentially about the axis.

15. The assembly of claim 1, further comprising:
a stationary structure including a structure flange and a retaining tab;
the arrestor mount is disposed in a channel formed by and axially between the structure flange and the retaining tab; and
the arrestor mount is bolted to the structure flange.

16. The assembly of claim 1, wherein the radial flow rotor is configured as a compressor impeller.

17. The assembly of claim 1, further comprising:
a compressor section, a turbine section and a combustion volume between the compressor section and the turbine section along a flowpath;
the compressor section comprising the radial flow rotor.

18. An assembly for a powerplant, comprising:
a radial flow rotor configured to rotate about an axis, the radial flow rotor including a rotor base and a plurality of rotor blades arranged circumferentially around and connected to the rotor base;
a rotor shroud circumscribing the radial flow rotor, the rotor shroud disposed adjacent tips of the plurality of rotor blades; and
a shroud arrestor structurally disengaged from the rotor shroud, the shroud arrestor including an arrestor body and an arrestor mount, the arrestor body circumscribing the rotor shroud and projecting longitudinally out from the arrestor mount to a distal end of the shroud arrestor, and the arrestor body having a cone shaped geometry;
the rotor shroud including a shroud wall and a shroud mount, the shroud wall disposed adjacent the tips of the plurality of rotor blades, an annular groove formed by and extending between the shroud wall and the shroud mount, and the arrestor body projecting longitudinally into the annular groove to the distal end of the shroud arrestor.

19. An assembly for a powerplant, comprising:

a radial flow rotor configured to rotate about an axis, the radial flow rotor including a rotor base and a plurality of rotor blades arranged circumferentially around and connected to the rotor base;

a rotor shroud circumscribing the radial flow rotor, the rotor shroud disposed adjacent tips of the plurality of rotor blades; and a shroud arrestor including an arrestor body and an arrestor mount, the arrestor body cantilevered from the arrestor mount and circumscribing the rotor shroud, the arrestor body projecting longitudinally out from the arrestor mount to a distal end of the shroud arrestor, and the arrestor body configured with an elliptical segment sectional profile between the arrestor mount and the distal end of the shroud arrestor;

the rotor shroud including a shroud wall and a shroud mount, the shroud wall disposed adjacent the tips of the plurality of rotor blades, an annular groove formed by and extending between the shroud wall and the shroud mount, and the arrestor body projecting longitudinally into the annular groove to the distal end of the shroud arrestor.

* * * * *